United States Patent [19]

Fujiyama et al.

[11] 4,146,031
[45] Mar. 27, 1979

[54] LEADER OR TRAILER FOR A MAGNETIC TAPE

[75] Inventors: Masaaki Fujiyama; Masahiro Utumi, both of Odawara, Japan

[73] Assignee: Fuji Photo Film Co., Ltd., Minami-ashigara, Japan

[21] Appl. No.: 816,183

[22] Filed: Jul. 15, 1977

[30] Foreign Application Priority Data

Jul. 26, 1976 [JP] Japan .................... 52-88201

[51] Int. Cl.$^2$ .................... G11B 5/78; B32B 5/16
[52] U.S. Cl. .................... 428/323; 242/195; 352/235; 360/134; 428/325; 428/328; 428/329; 428/330; 428/331; 428/340; 428/412; 428/339; 428/337; 428/336; 428/422; 428/447; 428/480; 428/497; 428/498; 428/500; 428/532; 428/539
[58] Field of Search .................... 352/235; 242/195; 428/900, 412, 480, 500, 532, 339, 337, 539, 336, 422, 421, 447, 451, 452, 323, 325, 328, 329, 330, 331, 212, 497, 498, 340, 539; 360/134

[56] References Cited

U.S. PATENT DOCUMENTS

| | | |
|---|---|---|
| 2,091,694 | 8/1937 | Taylor .................... 96/78 |
| 2,286,834 | 6/1942 | Rittenhouse .................... 352/235 |
| 2,606,409 | 8/1952 | Gordon .................... 352/235 |
| 3,078,759 | 2/1963 | Brunswick .................... 352/235 |
| 3,423,038 | 1/1969 | Katzef .................... 352/235 |
| 3,993,824 | 11/1976 | Shirahata .................... 428/900 |
| 3,993,846 | 11/1976 | Higuchi .................... 428/900 |
| 4,002,804 | 1/1977 | Akashi .................... 428/900 |
| 4,015,042 | 3/1977 | Chassaigne .................... 428/900 |
| 4,038,453 | 7/1977 | Loran .................... 428/900 |
| 4,042,189 | 8/1977 | Leurs .................... 352/235 |
| 4,047,232 | 9/1977 | Hisagen .................... 428/900 |

*Primary Examiner*—Ellis Robinson
*Attorney, Agent, or Firm*—Armstrong, Nikaido, Marmelstein & Kubovcik

[57] ABSTRACT

This invention relates to a leader or trailer for a magnetic tape, which comprises a plastic support member, a coated layer consisting essentially of a pigment and binder on the surface of the plastic support and a lubricant layer on the back side of the plastic support, the pigment consisting of a mixture of at least two solid powders each having a mean grain size of (A) 0.002 to 3 microns and (B) 5 to 35 microns and the lubricant layer being coated in a proportion of at least 0.1 mg/m$^2$.

10 Claims, 1 Drawing Figure

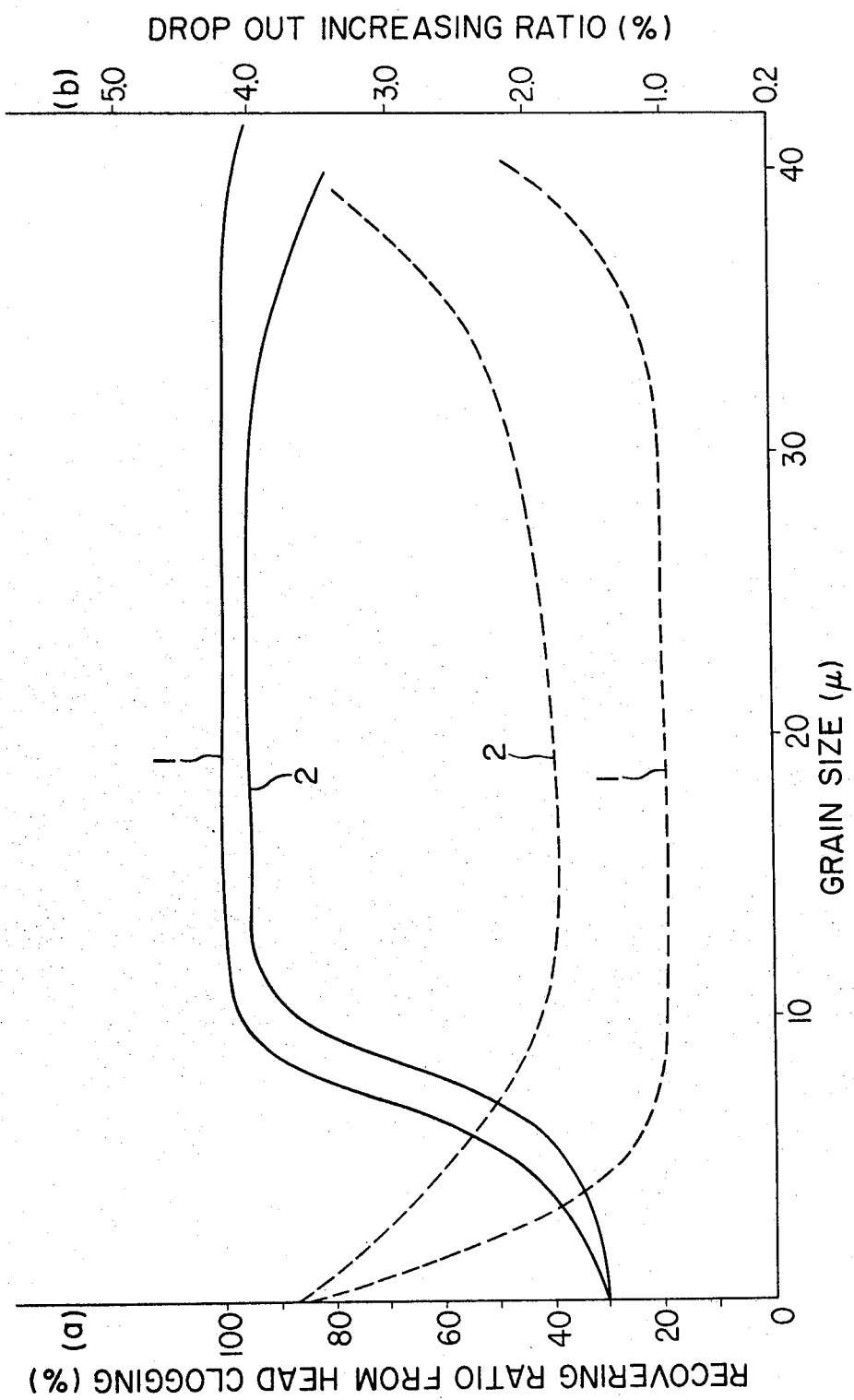

LEADER OR TRAILER FOR A MAGNETIC TAPE

BACKGROUND OF THE INVENTION

1. Field of the Invention

This invention relates to an improvement in a leader tape or trailer tape for a magnetic tape and more particular, it is concerned with a novel structure of a leader tape or trailer tape situated at the head portion or tail portion or, if necessary, intermediate portion of a long tape for magnetic recording such as video tapes, memory tapes or audio tapes.

2. Description of the Prior Art

Up to the present time, it has been considered that the phenomenon of drop out occurring in a magnetic tape section is a problem of the magnetic tape itself and is scarcely related with the leader tape. However, it is found by our studies that the drop outs increasing in a magnetic tape during running or occurring in the head of a magnetic tape during repeated use are governed by the properties of the leader tape and that the properties of not only the coated side but also the reverse side are important. When a magnetic tape is loaded in a cassette having a fixed guide pin with an acute tape winding angle, such a phenomenon that the magnetic tape sticks fast to the fixed guide pin and rewinding thereof is impossible occurs often in a leader of the prior art. Now it is found that this phenomenon is due to the leader and not due to the magnetic tape. That is to say, it is considered that if the leader has not suitable properties, the magnetic tape or guide system is contaminated, thus resulting in increasing of drop outs and poor results in rewinding of the magnetic tape. Furthermore, this causes scratching and scraping of the coating layer or base side.

As to such a leader tape or trailer tape, there have hitherto been proposed various proposals, for example, comprising (1) providing a metallic vapor deposition film in the form of a stripe (Japanese Utility Model Publication No. 14349/1971), (2) matting the one side or both sides of a base (Japanese Utility Model Publication No. 42726/1974) and (3) providing a coating layer containing 50 to 800 parts of a pigment having a grain size of 4 microns or less per 100 parts of a binder (Japanese Patent Application (OPI) Nos. 40504/1974 and 67603/1974). Above all, the method (3) is more preferable, but still has the following disadvantages: (1) The coating film is spoiled by a tape running system including a guide pole and magnetic head during repeated use, resulting in increase of drop outs and instability of the tape running property. (2) Dusts adhere to the end of a video head revolving at a high speed as in a helical VTR, resulting in clogging, and consequently, recording or reproducing of video signals becomes difficult. (3) The friction coefficient of the leader is increased at a high temperature and high humidity so that it is difficult to keep a required constant running speed and the tape running property is unstable. (4) The running property gets worse with the increase of the tape winding angle at rewinding.

SUMMARY OF THE INVENTION

It is an object of the invention to provide a leader or trailer for a magnetic tape.

It is another object of the invention to provide an improved leader tape or trailer tape whereby the above described disadvantages of the prior art are overcome.

It is a further object of the invention to provide a leader tape, in which the friction coefficient of the coated surface is hardly increased even by repeated use.

These objects can be attained by a leader or trailer for a magnetic tape which comprises a plastic support member, coating layer consisting essentially of a pigment and binder on the surface of the plastic support and lubricant layer on the back of the plastic support, the pigment consisting of a mixture of at least two solid powders each having a mean grain size of (A) 0.002 to 3 microns and (B) 5 to 35 microns and the lubricant layer being coated in a proportion of at least 0.1 mg/m$^2$.

BRIEF DESCRIPTION OF THE DRAWING

The accompanying drawing is a graph showing the relation of the grain size of a pigment with the recovering ratio from head clogging or drop out increasing ratio to illustrate the principle and merits of the invention in greater detail.

DETAILED DESCRIPTION OF THE INVENTION

We, the inventors, have made efforts to overcome the disadvantages of leader tapes or trailer tapes in the prior art, as described above, and consequently have reached the present invention. That is to say, the present invention provides a leader tape or trailer tape which comprises a plastic support, a coating layer consisting mainly of a pigment and binder provided on the surface of the support and a lubricant layer provided on the reverse side to the coating layer, the pigment consisting of a mixture of at least two solid powders each having a mean size of (A) 0.002 to 3 microns and (B) 5 to 35 microns and the lubricant layer being coated in a proportion of 0.1 mg/m$^2$ or more.

The support used in the present invention may be same as or different from that of a magnetic tape and can be chosen from various plastics, for example, polyesters such as polyethylene terephthalate and polyethylene naphthalate, polyolefins such as polyethylene and polypropylene, cellulose derivatives such as cellulose triacetate and cellulose diacetate, vinyl-type resins such as polyvinyl chloride, polycarbonates and the like. The thickness of the support should be same as or different from that of a magnetic tape and, in general, has a thickness of 4 to 150 microns, preferably 12 to 150 microns.

As the pigment of the present invention, there can be used any solid powders for example, white pigments such as white lead, zinc white, zinc sulfide, basic lead sulfate, antimony white, zirconium oxide, barium metaborate, Pattinson White (PbCl$_2$.Pb(OH)$_2$), manganese white, lithophone, titanium oxide, lead sulfate, lead silicate, calcium plumbate, tin oxide and tungsten white, extenders such as barium sulfate, barium carbonate, precipitated calcium carbonate, chalk, alumina white, silica, talc, calcium silicate, precipitated magnesium carbonate, bentonite, slaked lime, precipitated barium sulfate, Paris white, gypsum, clay, silica white, asbestine, magnesium carbonate, satin white, magnesia and strontium white and, in a case where the leader tape does require transparency, black pigments, dark pigments, red pigments, brown pigments, green pigments and blue pigments. In particular, inorganic pigments are preferable and two kinds of inorganic pigments (A) and (B) are preferably used in a (A) to (B) ratio of 9.5 to 0.5–1 to 9, more particularly 9 to 1–5 to 5. The mean grain size ranges preferably from 0.01 micron to 2 microns in the case of (A) and from 8 microns to 25 microns in the case of (B). The grains (B) have preferably a shape of flat plate and if the grain size of (B) is too large, drop outs increase due to flaking of the powder. The coarse grains (B) produce a roughness of 0.3 to 10 microns on the coated surface. The coating layer containing such a pigment has preferably a thickness of 2 to 15 microns.

As the binder of the invention, there can be used one or more of thermoplastic resins, thermosetting resins and electrically conductive resins. Useful examples of the thermoplastic resins are vinyl chloride/vinylidene chloride copolymers, vinyl chloride/vinylidene chloride copolymers, vinyl chloride/acrylonitrile copolymers, acrylic acid ester/acrylonitrile copolymers, acrylic acid ester/vinylidene chloride copolymers, acrylic acid ester/styrene copolymers, methacrylic acid ester/acrylonitrile copolymers, methacrylic acid ester/vinylidene chloride copolymers, methacrylic acid ester/styrene copolymers, urethane elastomers, polyvinyl fluoride, vinylidene chloride/acrylonitrile copolymers, butadiene/acrylonitrile copolymers, polyamide resins, polyvinyl butyral, cellulose derivatives such as cellulose acetate butyrate, cellulose diacetate, cellulose triacetate, cellulose propionate and nitrocellulose, styrene/butadiene copolymers, polyester resins, chlorovinyl ether/acrylic acid ester copolymers, amino resins and various synthetic rubbers. Useful examples of the thermosetting resins are phenol resins, epoxy resins, polyurethane hardening type resins, urea resins, melamine resins, alkyd resins, silicone resins, acrylic type reactive resins, epoxy/polyamide resins, nitrocellulose/melamine resins, mixtures of high molecular weight polyester resins and isocyanate prepolymers, mixtures of methacrylate copolymers and diisocyanate prepolymers, mixtures of polyesterpolyols and polyisocyanates, urea/formaldehyde resins, mixtures of low molecular weight glycols, high molecular weight diols and triphenyl methane triisocyanate, polyamide resins and mixtures thereof. As the electrically conductive resins, there can be used polycationic resins and quaternary ammonium resins, for example,

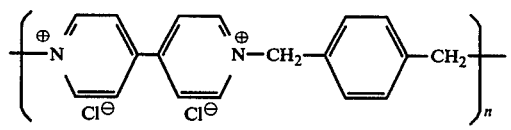

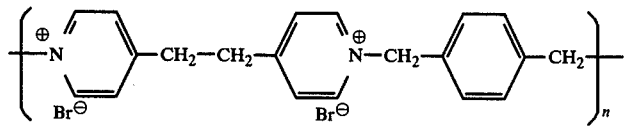

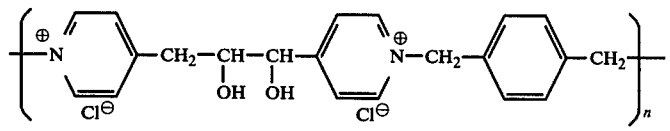

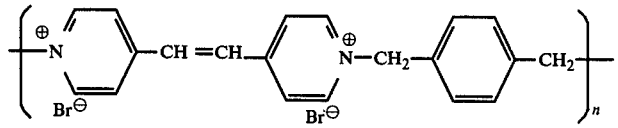

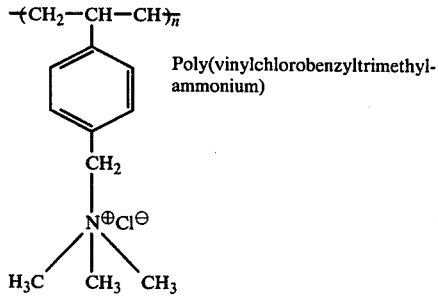

Poly(vinylchlorobenzyltrimethylammonium)

-continued

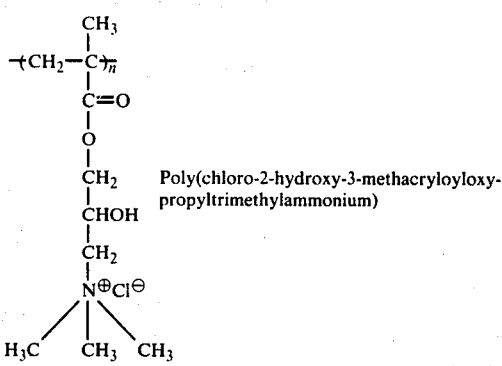
Poly(chloro-2-hydroxy-3-methacryloyloxy-propyltrimethylammonium)

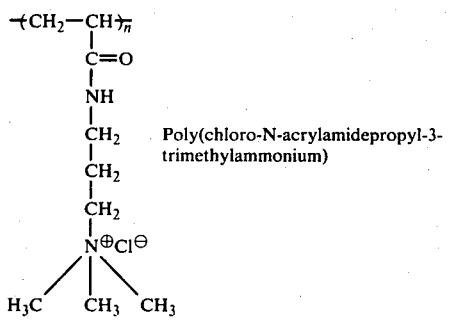
Poly(chloro-N-acrylamidepropyl-3-trimethylammonium)

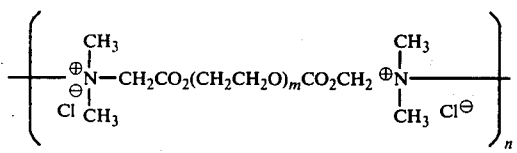

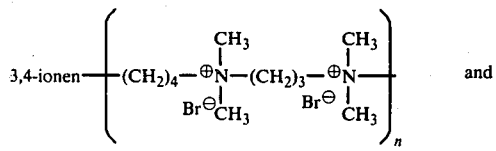
3,4-ionen         and

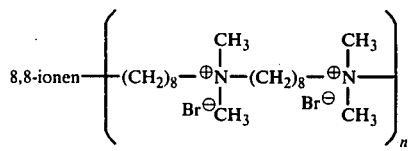
8,8-ionen

The pigment to binder ratio is preferably 6 to 1–0.5 to 1, more preferably 3.0 to 1–1.0 to 1.

As the lubricant for the lubricant layer provided on the back side of a support, there are preferably used organic lubricants such as silicone oils, fatty acid esters, fluorinated oils and waxes such as beeswax. The quantity of the lubricant ranges preferably from 0.1 to 1000 mg/m². The lubricant serves to protect a support base and, simultaneously, to give a lubricating effect through transfer of a part of the lubricant to the coating, thus preventing a head from chipping or surface roughening. If the coating quantity of such a lubricant is too large, the running system of a VTR is spoiled.

The following effects or advantages can be given by the use of the leader or trailer tape according to the present invention:

(1) The friction coefficient of the coated surface of a leader is hardly increased when it is repeatedly used.

(2) The drop out of a magnetic tape following the leader is hardly increased.

(3) Even if a video rotating head is contacted with the leader portion, there occurs no clogging and, rather, the head is cleaned.

(4) The tape running property is very excellent even at a high temperature and high humidity.

(5) There is no adhesion of a magnetic tape in a running system having a fixed guide pin.

The following examples are given in order to illustrate the invention without limiting the same. It will be obvious to one skilled in the art that various changes and modifications can be made in the components, ratios, operational order and the like without departing from the spirit of the present invention.

EXAMPLE 1

A cassette tape, Sample No. 1, combined with a leader tape prepared by a method of the prior art and cassette tapes, Sample Nos. 2 to 10, combined with a leader tape according to the present invention were compared with each other in drop out increasing ratio, rewinding failure ratio and friction coefficient increasing ratio.

The standard of assessment is defined as follows:

(1) Drop out increasing ratio

Various leaders were attached respectively to the end of a cassette tape of VTC-7230 type VTR made by Sanyo Denki Co. and then subjected to recording or reproducing while counting visually on the picture the drop outs of the head portion of the magnetic tape connected with the leader. Calculation of the drop out increasing ratio was carried out by the following formula:

$$\text{Drop Out Increasing Ratio} = \frac{\text{Number of Drop Outs during Reproducing after Running 50 times}}{\text{Number of Drop Outs during Reproducing at the First Time}}$$

(2) Rewinding Failure Ratio

Using the same VTR and cassette tape as in the above described test (1), they were subjected to operations of (1) Fast Forwarding 20 seconds - (2) Stopping - (3) Rewinding 1 second - (4) Stopping - (5) Rewinding 1 second - (6) Stopping. Thereafter, (5) and (6) were repeated to the head portion of the tape and then the operations were started over again from (1). After stopping, the tape was further subjected to rewinding, but, often, it did not run. This case was called "Rewinding Failure". Calculation of the rewinding failure ratio was $$\text{Rewinding Failure Ratio} = \frac{\text{Number of Rewinding Failures}}{\text{Number of Repetitions of Rewindings and Stopping}} \times 100$$

(3) Friction Coefficient Increasing Ratio

The leader was wound round an alumite roller of 50 mm in diameter in such a manner that the pigment coated surface of the leader was contacted with the roller and then subjected to measurement of the friction coefficient for 1 minute under a load of 100 g and at a relative speed of 13 cm/sec. Calculation of the friction coefficient increasing ratio was carried out by the following formula:

$$\text{Friction Coefficient Increasing Ratio} = \frac{\text{Friction Coefficient after Roll Revolving for 1 minute}}{\text{Friction Coefficient after Roll Revolving for 5 seconds}}$$

Preparation of Samples

Sample Nos. 2 to 10 were prepared by the following procedures. Predetermined amounts of a pigment (A), binder and organic solvent were charged in a ball mill, dispersed for about 15 hours and then mixed with another pigment (B) followed by dispersing further for 5 hours to prepare a coating composition. One side of a polyethylene terephthalate film base with a thickness of 36 microns was coated with this coating composition followed by drying, while the other side of the base was coated with a lubricant diluted with a solvent to give a coating layer of 0.1 mg/m$^2$ on dry base. The above described coated surface was slit in a width of ½ inch and combined with a cassette tape of VTC-7230 VTR made by Sanyo Denki Co. The leader tape was exchanged with various leader tapes thus prepared to prepare various cassette tapes. In the above described coating composition, a mixture comprising 41% of vinyl chloride/vinyl acetate copolymer, 32% of electrically conductive acrylic resin, 22% of isocyanate, 2.5% of lecitin and 2% of silicone oil was used as a binder and methyl ethyl ketone was used as a solvent.

Sample No. 1 was prepared in an analogous manner to Sample Nos. 2 to 10 except that the pigment (B) was not added and the back side of a support was not coated with a lubricant. The test results for comparison of Sample Nos. 1 to 10 as to the above described properties are shown in Table 1.

Table 1

| Sample No. | Pigment (A) Material | Pigment (A) Mean Grain Size ($\mu$) | Parts | Pigment (B) Material | Pigment (B) Mean Grain Size ($\mu$) | Parts | Pigments (A) + (B) / Binder | Lubricant Material | Lubricant Content (mg/m$^2$) | Friction Coefficient Increasing Ratio (times) | Drop Out Increasing Ratio after Use 50 times (times) | Rewinding Failure Ratio (%) |
|---|---|---|---|---|---|---|---|---|---|---|---|---|
| 1 | Calcium Carbonate | 0.07 | 10 | No | | | 2/1 | No | | 1.4 | 3.6 | 5 |
| 2 | " | " | 9 | Magnesium Silicate | 10 | 1 | " | Amyl Stearate | 8 | 1.15 | 1.5 | 0 |
| 3 | " | " | 8 | " | " | 2 | " | " | " | 1.0 | 1.1 | 0 |
| 4 | " | " | 6 | " | " | 4 | " | " | 10 | 1.0 | 1.0 | 0 |
| 5 | " | " | 5 | " | " | 5 | " | " | " | 1.0 | 1.0 | 0 |
| 6 | " | 2 | 8 | " | 8 | 2 | 3/1 | " | 0.1 | 1.0 | 2.1 | 0.01 |
| 7 | " | " | " | " | " | " | " | " | 1000 | 1.0 | 1.0 | 0 |
| 8 | Zinc Oxide | " | 7.5 | " | 5 | 2.5 | 1/1 | Silicone Oil | 50 | 1.05 | 1.2 | 0 |
| 9 | " | " | " | " | 20 | " | " | " | " | 1.0 | 1.0 | 0 |
| 10 | " | " | " | " | 40 | " | " | " | " | 1.0 | 2.2 | 0 |

As is evident from the results of Table 1, Sample Nos. 2 to 5 of the present invention are superior to Sample No. 1 of the prior art in respect of all the drop out increasing ratio, rewinding failure ratio and friction coefficient increasing ratio. In view of Sample Nos. 6 and 7, in particular, it is apparent that the lubricant can be used in a coating quantity of at least 0.1 mg/m$^2$ and if less than this range, the effect is little. Moreover, it is apparent therefrom that the pigment (B) has preferably a grain size of 8 to 25 microns, the pigment (A) has preferably a grain size of 0.01 to 2 microns and the pigment to binder ratio is preferably 3.0 to 1–1.0 to 1, but it has also been found by other experiments that a pigment (B) having a grain size of 5 to 35 microns and a pigment (A) having a grain size of 0.002 to 3 microns can be used, preferably, with a pigment to binder ratio of 6 to 1–0.5 to 1. Since the optical permeability is deteriorated and, simultaneously, the surface electric resistance is increased with the increase of the grain size of (A), a smaller grain size is preferable, but in the case of an extremely small grain size, the durability of the coating is inferior. Therefore, the above described range is preferable.

When an adhesive of a combined tape is adhered to a video rotating head, the recovery ratio is only 3/10 through th leader of Sample No. 1 according to the prior art, while a high recovery ratio can be obtained through the leader of the present invention. As to the tape running property at a temperature of 30° C. and humidity of 90%, the speed is decreased in the case of Sample No. 1 while there is found no abnormal phenomenon in the case of the present invention.

EXAMPLE 2

Coating Layer

Pigment (A): Calcium Carbonate, mean grain size of 2 microns
Pigment (B): Magnesium Silicate, mean grain size of 1 to 40 microns
Binder: Same as that of Example 1
Pigment (A)/Pigment (B) = 8 parts/2 parts
Pigments (A) + (B)/Binder = 3/1

Lubricant Layer

Amyl Stearate was used with a content of 7 mg/m$^2$ or 0.1 mg/m$^2$.

When the grain size of the pigment (B) is changed under the above described conditions, the head clogging recovery ratio and drop out increasing ratio are examined to obtain results as shown in the accompanying drawing, in which the abscissa shows the grain size ($\mu$) of the pigment (B) and the ordinates (a) and (b) show respectively the head clogging recovery ratio (%) and drop out increasing ratio (%) after 50 times. In this graph, the solid lines correspond to the recovering ratio from head clogging and the broken lines correspond to the drop out increasing ratio after 50 times, Curve 1 being the case of a lubricant content of 7 mg/m$^2$ and Curve 2 being the case of a lubricant content of 0.1 mg/m$^2$.

It is apparent from the drawing that the effect appears when the grain size of the pigment (B) is 5 microns and rather disappears when the grain size exceeds 35 microns.

What is claimed is:

1. A leader or trailer for a magnetic tape, the leader or trailer comprising a plastic support, a coating layer consisting essentially of an inorganic, non-magnetic pigment and binder on the surface of the plastic support and a lubricant layer on the back side of the plastic support, the inorganic, non-magnetic pigment consisting of a mixture of at least two solid powders (A) having a mean grain size of 0.002 to 3 microns and (B) having a mean grain size of 5 to 35 microns, the mixing ratio of the pigments (A)/(B) being from 9.5/0.5 to 1/9, and the lubricant layer being coated in a proportion of at least 0.1 mg/m$^2$.

2. The leader or trailer for a magnetic tape as claimed in claim 1, wherein the plastic support is of at least one material selected from the group consisting of polyesters, polyolefins, cellulose derivatives, vinyl resins and polycarbonates.

3. The leader or trailer for a magnetic tape as claimed in claim 1, wherein the plastic support has a thickness of 4 to 150 microns.

4. The leader or trailer for a magnetic tape as claimed in claim 1, wherein the pigment is at least one material selected from the group consisting of white lead, zinc white, zinc sulfide, basic lead sulfate, antimony white, zirconium oxide, barium metaborate, Pattinson White, manganese white, lithophone, titanium oxide, lead sulfate, lead silicate, calcium plumbate, tin oxide, tungsten white, barium sulfate, barium carbonate, precipitated calcium carbonate, chalk, alumina white, silica, talc, calcium silicate, precipitated magnesium carbonate, bentonite, slaked lime, precipitated barium sulfate, Paris white, gypsum, clay, silica white, asbestine, magnesium carbonate, satin white, magnesia and strontium white.

5. The leader or trailer for a magnetic tape as claimed in claim 1, wherein the pigment coating layer has a roughness of 0.3 to 10 microns.

6. The leader or trailer for a magnetic tape as claimed in claim 1, wherein the pigment coating layer has a thickness of 2 to 15 microns.

7. The leader or trailer for a magnetic tape as claimed in claim 1, wherein the binder is at least one material selected from the group consisting of thermoplastic resins, thermosetting resins and electrically conductive resins.

8. The leader or trailer for a magnetic tape as claimed in claim 1, wherein the pigment/binder ratio is from 6/1 to 0.5/1.

9. The leader or trailer for a magnetic tape as claimed in claim 1, wherein the lubricant is at least one material selected from the group consisting of silicone oils, fatty acid esters, fluorinated oils and waxes.

10. The leader or trailer for a magnetic tape as claimed in claim 1, wherein the lubricant layer is coated in a proportion of 0.1 to 1000 mg/m$^2$.

* * * * *